(12) United States Patent
Miyoshi et al.

(10) Patent No.: US 12,162,770 B2
(45) Date of Patent: *Dec. 10, 2024

(54) BLACK POWDER, AND METHOD FOR PRODUCING SAME

(71) Applicant: UBE EXSYMO CO., LTD., Tokyo (JP)

(72) Inventors: Hidenori Miyoshi, Tokyo (JP); Kenta Gotou, Tokyo (JP)

(73) Assignee: UBE EXSYMO CO., LTD., Tokyo (JP)

(*) Notice: Subject to any disclaimer, the term of this patent is extended or adjusted under 35 U.S.C. 154(b) by 18 days.

This patent is subject to a terminal disclaimer.

(21) Appl. No.: 18/144,679

(22) Filed: May 8, 2023

(65) Prior Publication Data

US 2023/0271841 A1    Aug. 31, 2023

Related U.S. Application Data

(63) Continuation of application No. 16/641,565, filed as application No. PCT/JP2018/030227 on Aug. 13, 2018, now Pat. No. 11,679,985.

(30) Foreign Application Priority Data

Aug. 31, 2017  (JP) .................... 2017-166608

(51) Int. Cl.
 *C01B 33/18* (2006.01)

(52) U.S. Cl.
 CPC .......... *C01B 33/182* (2013.01); *C01B 33/183* (2013.01); *C01P 2006/80* (2013.01)

(58) Field of Classification Search
 None
 See application file for complete search history.

(56) References Cited

U.S. PATENT DOCUMENTS 4,789,389 A    12/1988  Schermerhorn et al.

FOREIGN PATENT DOCUMENTS

| JP | H03279209 A | 12/1991 |
|---|---|---|
| JP | H0840707 A | 2/1996 |
| JP | H1149953 A | 2/1999 |
| JP | 2004123454 A | 4/2004 |
| JP | 2014114358 A | 6/2014 |
| JP | 2014115399 A | * 6/2014 |
| JP | 2014115399 A | 6/2014 |

OTHER PUBLICATIONS

Machine translation of JP H0840707 A published on Feb. 13, 1996 (18 pages).
Machine translation of JP2004-123454 published on Apr. 22, 2004 (30 pages).

(Continued)

*Primary Examiner* — Michael Forrest
(74) *Attorney, Agent, or Firm* — J. Miguel Hernandez; James R. Gourley; Carstens, Allen & Gourley, LLP

(57) ABSTRACT

Disclosed is a black powder comprising silica particles that contain carbon. Each of the silica particles is single-layered. The content of carbon contained in the surfaces of the silica particles measured by an X-ray photoelectron spectroscopy is 1% by mass or less.

3 Claims, 1 Drawing Sheet

(56) References Cited

OTHER PUBLICATIONS

Machine translation of Office Action for JP Application No. 2022-165569 issued on Sep. 21, 2023 (4 pages).
Office Action for JP Application No. 2022-165569 issued on Sep. 21, 2023 (4 pages).
Extended European Search Report for European Application No. 18851128.1 dated May 3, 2021 (10 pages).
Kamiya, Kanichi, "Distribution of Carbon Particles in Carbon / SiO2 Glass Composites Made from CH3Si(OC2H5)3 by the SOL-Gel Method," J. of Non-Crystalline Solids 119 (1990) 14-20, North Holland (7 pages).
Machine translation of JP2014115399 generatedon Jan. 20, 2023 (Year: 2023) (20 pages).

* cited by examiner

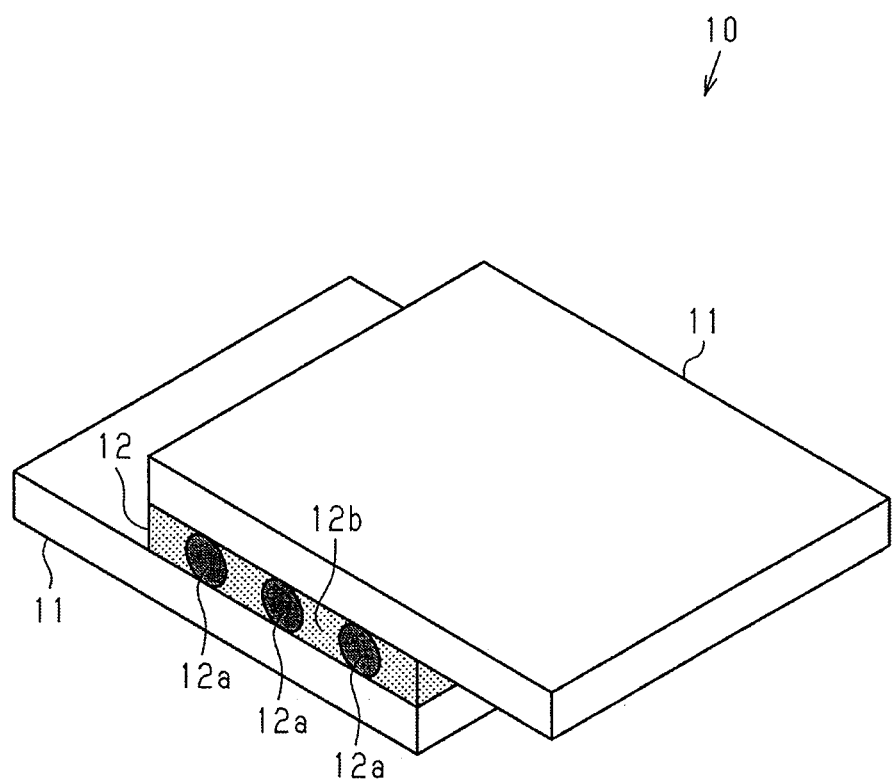

BLACK POWDER, AND METHOD FOR PRODUCING SAME

CROSS-REFERENCE TO RELATED APPLICATIONS

This application is a continuation application of pending U.S. Ser. No. 16/641,565 filed on Feb. 24, 2020 entitled "Black Powder, and Method for Producing Same," which is a U.S. National Stage of International Application No. PCT/JP2018/030227, filed on Aug. 13, 2018 and published as WO 2019/044480 on Mar. 7, 2019, which claims priority to Japanese Patent Application No. 2017-166608 filed on Aug. 31, 2017. Each application, publication, and patent listed in this paragraph are hereby incorporated by reference in their entireties.

TECHNICAL FIELD

The present invention relates to a black powder and a method for manufacturing the black powder.

BACKGROUND ART

The use of, for example, black particles as a spacer for a liquid crystal display is known in the art (Patent Document 1). Patent Document 1 discloses a black powder obtained from a powder of composite particles combining an organopolysiloxane and a vinyl polymer.

PRIOR ART LITERATURE

Patent Literature

Patent Document 1: Japanese Laid-Open Patent Publication No. 2014-115399

SUMMARY OF THE INVENTION

Problem that the Invention is to Solve

In recent years, drive voltages of devices using a black powder have increased. Accordingly, there is a need for a black powder having a high withstand voltage characteristic. With the conventional black powder, it is difficult to ensure electric insulation when relatively high voltages are applied.

One object of the present invention is to provide a black powder that has a higher withstand voltage characteristic and a method for manufacturing the black powder.

Means for Solving the Problem

A black powder that solves the above problem comprises silica particles that contain carbon. Each of the silica particles is single-layered and the content of carbon contained in the surfaces of the silica particles measured by an X-ray photoelectron spectroscopy is 1% by mass or less.

In the above-described black powder, it is preferred that content of carbon inside the silica particles be 5% by mass or greater.

A method for manufacturing the black powder includes obtaining first particles containing a condensate that is obtained from trialkoxysilane, which is expressed by equation (1):

$$R^1Si(OR^2)_3 \quad (1)$$

(In equation (1), $R^1$ is a non-hydrolyzable group and represents an alkyl group having 1 to 20 carbon atoms, an alkyl group having 1 to 20 carbon atoms and including a (meth) acryloyloxy group or an epoxy group, an alkenyl group having 2 to 20 carbon atoms, an aryl group having 6 to 20 carbon atoms, or an aralkyl group having 7 to 20 carbon atoms, $R^2$ represents an alkyl group having 1 to 6 carbon atoms, and $OR^2$ may be the same or differ from each other.), carbonizing an organic component in the first particles to obtain second particles containing carbon, and removing carbon contained in the surfaces of the second particles.

Effect of the Invention

The present invention allows for obtaining a higher withstand voltage characteristic.

BRIEF DESCRIPTION OF THE DRAWING

FIG. 1 is a schematic perspective view of a panel used for a withstand voltage test.

MODE FOR CARRYING OUT THE INVENTION

One embodiment of a black powder and a method for manufacturing the black powder will now be described.

<Black Powder>

A black powder comprises silica particles that contain carbon. Each of the silica particles is single-layered. The content of carbon contained in the surfaces of the silica particles is 1% by mass or less. The content of carbon contained in the surfaces of the silica particles can be measured by an X-ray photoelectron spectroscopy.

A silica particle having the single-layer structure does not entirely have an interface of silica or an interface between silica and another layer. In other words, such a silica particle has a continuous structure configured by a siloxane framework formed over the entire particle. The surface of the silica particle does not have a coating layer.

The content of carbon contained in the surfaces of the silica particles is 1% by mass or less. The content of carbon inside the silica particles is preferably 5% by mass or greater, and further preferably 9% by mass or greater. In a case where the content of carbon inside the silica particles is 5% by mass or greater, a higher blackness will be obtained. The content of carbon inside the silica particles is preferably 25% by mass or less, and further preferably 20% by mass or less. In a case where the content of carbon inside the silica particles is 25% by mass or less, the withstand voltage characteristic will be further increased. The content of carbon inside the silica particles can be measured by a high frequency induction furnace combustion-infrared absorption method.

The Y value of the black powder in the XYZ color system is preferably 6% or less, and further preferably 3% or less. The Y value in the XYZ color system is a value measured in accordance with JIS Z8701:1999. The technical content of JIS Z8701:1999 is equivalent to ISO/CIE 10526, CIE standard colorimetric illuminants, 1st Ed.: 1991 and ISO/CIE 10527, CIE standard colorimetric observers, 1st Ed.: 1991, which are international standard corresponding to JIS Z8701:1999.

A particle size distribution of the black powder is indicated by a CV value (coefficient of variation) as shown below.

CV value (%)={standard deviation of particle size [μm]/average particle size [μm]}×100

The CV value of the black powder is preferably 5% or less, and further preferably 2.5% or less.

The 10% K value of the black powder is preferably in a range of 30000 N/mm² or greater and 100000 N/mm² or less, and further preferably in a range of 50000 N/mm² or greater and 80000 N/mm² or less.

The 10% K value is obtained through the following equation by measuring displacement [mm] of the black powder when compressed with a micro-compression testing machine under the conditions in which a compression speed is 0.029 g/second and a maximum load is 10 g.

$$10\% \ K \text{ value } [\text{N/mm}^2] = (3/2^{1/2}) \times F \times S^{-3/2} \times R^{-1/2}$$

In the above equation, "F" corresponds to the load [N] on the black powder under 10% compression deformation, "S" corresponds to the displacement [mm] of the black powder under 10% compression deformation, and "R" corresponds to the radius [mm] of the black powder.

The average particle size of the black powder is preferably 1 μm or greater, and further preferably 3 μm or greater. In this case, the blackness of the black powder is readily increased. The average particle size of the black powder is preferably 200 μm or less, and further preferably 100 μm or less.

The black powder is applied to, for example, spacers (in-plane spacer) for a liquid crystal panel, precision gap materials of an optical device or various types of sensors, or precision gap materials of various types of sensors. In a case where the black powder is used as a spacer of a liquid crystal panel, the particle diameter of each silica particle forming the black powder is in a range of, for example, 3 μm or greater and 40 μm or less. In a case where the black powder is used as a precision gap material, the particle diameter of each silica particle forming the black powder is in a range of, for example, 10 μm or greater and 100 μm or less. The black powder is applicable as a highly insulative black-colored filler.

<Method for Manufacturing Black Powder>

A method for manufacturing the black powder will now be described.

The method for manufacturing the black powder includes a step of obtaining first particles containing a condensate that is obtained from trialkoxysilane, and a step (carbonization step) of carbonizing an organic component in the first particles to obtain second particles containing carbon. The method for manufacturing the black powder further includes a step (removal step) of removing carbon contained in the surfaces of the second particles.

The first particles can be obtained through a seed particle formation step and a grown particle formation step.

In the seed particle formation step, a catalyst is added to a solution for hydrolysis and condensation of alkoxysilane. The solution is obtained by dissolving alkoxysilane containing at least trialkoxysilane in an aqueous solution. This forms the seed particles containing the condensate of trialkoxysilane. The seed particle formation step is performed to obtain a seed particle aqueous dispersion liquid in which the seed particles are dispersed as droplets in an aqueous dispersion medium.

The trialkoxysilane can be expressed by the following equation (1).

$$R^1 Si(OR^2)_3 \quad (1)$$

In equation (1), $R^1$ is a non-hydrolyzable group and represents an alkyl group having 1 to 20 carbon atoms, an alkyl group having 1 to 20 carbon atoms and including a (meth)acryloyloxy group or an epoxy group, an alkenyl group having 2 to 20 carbon atoms, an aryl group having 6 to 20 carbon atoms, or an aralkyl group having 7 to 20 carbon atoms. Further, $R^2$ represents an alkyl group having 1 to 6 carbon atoms, and $OR^2$ may be the same or differ from each other.

Examples of the trialkoxysilane expressed by equation (1) include methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, vinyltrimethoxysilane, vinyltriethoxysilane, γ-glycidoxypropyltrimethoxysilane, γ-acryloyloxypropyltrimethoxysilane, and γ-methacryloyloxypropyltrimethoxysilane.

The trialkoxysilane expressed by equation (1) may be of one type or a combination of two or more types.

The trialkoxysilane may be used in combination with at least one selected from tetraalkoxysilane, dialkoxysilane, and monoalkoxysilane. The carbon content of the black powder can be set in any manner through a selection of various types of silane compounds and organic substituents.

Examples of the aqueous solvent include water and a mixed solvent of water and a water-miscible organic solvent. Examples of the water-miscible organic solvent include lower alcohols, such as methanol, ethanol, propanol, and butanol; ketones, such as acetone, dimethyl ketone, and methyl ethyl ketone; and ethers, such as diethyl ether and dipropyl ether. The water-miscible organic solvent may be of one type or a combination of two or more types.

The aqueous solvent may include a stabilizer in order to increase solubility of the trialkoxysilane and stabilize the generated seed particles. Examples of the stabilizer include a surfactant and a polymer dispersant. Preferably, a nonionic stabilizer is used when reduction of residual ionic substances in the silica particles is desired.

The catalyst for hydrolysis and condensation may be at least one of ammonia and an amine. Examples of amine include monomethylamine, dimethylamine, monoethylamine, diethylamine, and ethylenediamine. The catalyst may be of one type or a combination of two or more types. Among catalysts, ammonia is preferred since ammonia is less toxic, easily removed from the particles, and inexpensive.

The reactions of hydrolysis and condensation are obtained while agitating the trialkoxysilane and the catalyst in the aqueous solvent. The amount of the catalyst added at the beginning of the reactions can be set in accordance with, for example, the type or concentration of the trialkoxysilane and a target particle diameter of obtained particles. The reaction temperature is set in accordance with the type of the trialkoxysilane. Preferably, for example, the reaction temperature is in a range of 0° C. to 50° C.

Preferably, the average particle size of the seed particles is 0.3 μm or greater and 15 μm or less. Preferably, the CV value of the seed particles is 5% or lower.

In the grown particle formation step, an aqueous alkoxysilane solution containing at least trialkoxysilane is used. The aqueous alkoxysilane solution and the above-described seed particle aqueous dispersion liquid are mixed so that the seed particles absorb the alkoxysilane. This forms grown particles, which are grown seed particles. In the grown particle formation step, a grown particle aqueous dispersion liquid is obtained.

The trialkoxysilane expressed by the above-described equation (1) may be included in a solution for particle growth.

The trialkoxysilane may be used in combination with at least one selected from tetraalkoxysilane, dialkoxysilane, and monoalkoxysilane. The silane compound used in the grown particle formation step may be the same as or differ from the silane compound used for the seed particles. In a case where a silane compound, which differs from the one used for the seed particles, is selected in the grown particle formation step, an organic substituent differing from the seed particles can be added to the grown particles so that the carbon content in the black powder is set in any manner.

The aqueous solvents exemplified as used in the seed particle formation step may be the aqueous solvent used for the particle growth solution. The particle growth solution may include a stabilizer in the same manner as in the seed particle formation step.

The grown particles obtained in the grown particle formation step can be used as the first particles.

The first particles may be, for example, composite particles combining the above-described condensate of trialkoxysilane (organopolysiloxane) and a vinyl polymer. Preferably, the vinyl polymer includes a vinyl polymer having a nitrile group. The vinyl polymer having a nitrile group may include a structural unit of at least one of acrylonitrile and methacrylonitrile. The structural unit of the vinyl polymer having a nitrile group may include, for example, methyl acrylate, vinyl acetate, or methyl methacrylate. The vinyl polymer having a nitrile group preferably includes a vinyl polymer including a structural unit of acrylonitrile, and further preferably includes 50% by mole or greater of acrylonitrile.

The composite particles can be obtained by performing a composition step subsequent to the grown particle formation step. In the composition step, an emulsion containing vinyl monomers is first prepared. The vinyl monomers are dispersed in an aqueous dispersion medium with an emulsifier in accordance with a common procedure to obtain an emulsion in which the vinyl monomers are dispersed as oil droplets. The emulsion may contain vinyl monomers of one type or two more types.

The aqueous dispersion medium may be the exemplified aqueous solvent used in the seed particle formation step. The content of the vinyl monomers in the emulsion is, for example, 10% to 70% by mass.

The emulsifier may be selected using an index of, for example, the HLB value (hydrophilic-lipophilic balance value). For example, an alkyl sulfate that includes an alkyl group having 6 to 30 carbon atoms is used as the emulsifier in a preferred manner. Examples of salt of the alkyl sulfate include potassium salt, sodium salt, and ammonium salt.

The emulsion further contains a radical polymerization initiator. The type of the radical polymerization initiator is not particularly limited and may be, for example, an azo polymerization initiator, such as azobisisobutyronitrile, or a peroxide, such as benzoyl peroxide. The content of the radical polymerization initiator in the emulsion relative to one mole of the monomers is preferably in a range of 0.001 to 20 moles, and further preferably in a range of 0.01 to 10 moles.

The prepared emulsion is mixed with the grown particle aqueous dispersion liquid. The vinyl monomers are absorbed by the grown particles in the obtained mixture liquid. Then, the mixture liquid is heated to radically polymerize the vinyl monomers. This forms the first particles as solid composite particles.

The first particles may be obtained by processing the grown particles with a coupling agent.

The carbonization step for obtaining the second particles will now be described. The carbonization step is performed in a gas having a lower oxygen concentration than air. The gas having a lower oxygen concentration than air may be of at least one type selected from inert gases and reducing gases. Examples of the inert gas include nitrogen gas, helium gas, neon gas, and argon gas. The reducing gas is, for example, ammonia gas. The gas used in the carbonization step may be a mixed gas obtained by mixing air and at least one type of gas selected from the inert gases and the reducing gases, or may be only one type of gas selected from the inert gases and the reducing gases. In order to increase the efficiency of the carbonization step, the oxygen concentration in the atmosphere for the carbonization step is preferably less than 7.0% by volume, and further preferably less than 3.0% by volume.

The heating temperature in the carbonization step is preferably in a range of 600° C. or greater and 1500° C. or less, and further preferably in a range of 800° C. or greater and 1300° C. or less. When the heating temperature is 600° C. or greater, the carbonization step can be performed efficiently. When the heating temperature is 1500° C. or less, for example, deformation is not likely to be caused by the heat, and the obtained second particles readily have a stable shape (spherical shape). This also reduces aggregation of the second particles. The heating time in the carbonization step is, for example, in a range of one hour or greater and 48 hours or less.

The removal step for obtaining the black powder will now be described. The removal step is performed to decrease the content of carbon contained in the surfaces of the second particles. In the removal step, the second particles are heated under the presence of oxygen (in oxidizing atmosphere) to generate carbon oxide gas, such as carbon dioxide and carbon monoxide. Thus, in the removal step, part or all of the carbon contained in the surfaces of the second particles is volatilized as carbon oxide gas.

The removal step can be performed by adjusting the oxygen concentration in the atmosphere. Alternatively, the removal step can be performed in an air atmosphere. A predetermined amount of oxygen present in a firing furnace accelerates oxidation decomposition of the carbon component and increases the efficiency of the removal step. Thus, the oxygen concentration in the atmosphere in the removal step is preferably in a range of 7.0% by volume or greater. The heating temperature in the removal step is preferably in a range of 400° C. or greater and 1500° C. or less, and further preferably in a range of 600° C. or greater and 1100° C. or less. When the heating temperature is 400° C. or greater, the removal step can be performed efficiently. When the heating temperature is 1500° C. or less, for example, deformation is not likely to be caused by heat, and the obtained silica particles readily have a stable shape (spherical shape). This also reduces aggregation of the silica particles. The heating time in the removal step is, for example, in a range of one hour or greater and 48 hours or less.

In the removal step, the carbon in the second particles reacts with the oxygen in the atmosphere more readily at a portion closer to the surface relative to a radial direction of each second particle. Thus, each silica particle forming the black powder is estimated to have an inclined structure in which the carbon content increases inward from the surface.

The first particles of the present embodiment contain the organic component evenly added in the siloxane framework. Thus, the second particles obtained in the carbonization step contain carbon evenly distributed in the surfaces of particles and inside the particles. The carbon is evenly distributed without being localized so that part of or all of the carbon can be removed from the surfaces of the second particles in the removal step in an efficient and stable manner.

The above described embodiment has the following advantages.

(1) The black powder comprises silica particles that contain carbon. Each of the silica particles is single-layered. That is, each silica particle does not entirely have an interface of silica. This reduces structural breakdown and dielectric breakdown of silica and readily ensures insulation that would be obtained by silica. Further, the carbon content contained in the surfaces of the silica particles is 1% by mass or less. That is, the surfaces of the silica particles are formed of high-purity silica and are highly insulative. This obtains an even higher withstand voltage characteristic.

(2) Preferably, the carbon content inside the silica particles is 5% by mass or greater. This further increases the blackness of the silica particles.

(3) In a liquid crystal panel, when abnormal orientation of liquid crystal molecules occurs at an interface of a spacer and a liquid crystal, light may leak and form a light spot or a dark spot that is visually recognizable on a screen of the liquid crystal display. Such a light spot and a dark spot lower the display quality of the screen of the liquid crystal display. Here, abnormal orientation of liquid crystal molecules is known to occur when the liquid crystal is aligned by a functional group in the surfaces of the particles, which serve as the spacer. The abnormal orientation of liquid crystal molecules can be solved by surface-treating the particles serving as the spacer. That is, surface treatment of the particles serving as the spacer is a commonly known measure for preventing abnormal orientation of liquid crystal molecules.

When the black powder of the present embodiment is used as a spacer (in-plane spacer) for a liquid crystal panel, abnormal orientation of liquid crystal molecules will not be observed even if modification of the surface condition such as a surface treatment using a coupling agent is not performed. Thus, the silica particles forming the black powder of the present embodiment do not require any special post-treatment to reduce the occurrence of abnormal orientations. The reason for this is that the surfaces of the silica particles of the present embodiment include a further stable silica framework and substantially do not include a functional group such as a hydroxyl group or an organic group. Thus, it is considered that an orientation regulation force is relatively weak, and the effect on the orientation of the liquid crystal molecules is small. In particular, the silica particles are heated to 800° C. or greater in at least one of the carbonization step and the removal step to increase the silica purity in the surfaces. This further reduces the effect of the silica particles on the orientation of the liquid crystal molecules.

Technical concepts that are recognizable from the above embodiment will now be described.
  (a) The method for manufacturing the black powder, wherein said removing carbon includes heating the second particles under an atmosphere that contains oxygen and volatilizing carbon contained in the surfaces of the second particles as carbon oxide gas.
  (b) The method for manufacturing the black powder, wherein the second particles are heated at a temperature of 400° C. or greater during the removal of carbon.
  (c) A black powder comprising particles each of which includes a core and a shell, wherein the shell contains carbon and includes a single-layer structure of silica, and the content of carbon contained in the surfaces of the shells measured by an X-ray photoelectron spectroscopy is 1% by mass or less.

It is understood that as long as at least the surface of each particle forming the black powder has a continuous structure formed by a siloxane framework, structural breakdown and dielectric breakdown are unlikely to occur. Accordingly, a highly insulative property and a high withstand voltage characteristic can be obtained even if the black powder comprises particles each including a core having a framework differing from that of silica, that is, even if the black powder comprises particles each having multiple layers instead of a single layer.

EXAMPLES

Examples and comparative examples will now be described.

Example 1

<Preparation of Seed Particles>

140 g of methyltrimethoxysilane (MTMS) and 1200 g of water were agitated at 20° C. for one hour, and 11 g of 1N-ammonia aqueous solution was added and agitated for another twenty minutes to obtain a seed particle dispersion liquid.

<Particle Growth Step>

In a solution in which 240 g of methyltrimethoxysilane and 1187 g of water were agitated at 25° C. for one hour, 13 g of 1% dodecyl ammonium sulfate aqueous solution was mixed to prepare a particle growth solution. 240 g of the seed particle dispersion liquid was added to the particle growth solution and agitated to grow the seed particles while observing the particle diameter with an optical microscope. The growth of the particles stopped after approximately two hours. Subsequently, 50 g of 25% by mass ammonia water was added to solidify the grown particles and obtain the first particles. The obtained first particles underwent solid-liquid separation by decantation and were washed three times with methanol. The washed first particles were naturally dried for two days and then heated and dried at 110° C. The color of the obtained first particles was white.

<Carbonization Step>

The dried and solidified particles were heated at 1000° C. for four hours in a nitrogen atmosphere to obtain the second particles in which the organic component in the first particles was carbonized.

<Removal Step>

The obtained second particles were heated in an air atmosphere at 1000° C. for four hours to obtain the black powder.

Example 2

<Preparation of Seed Particles>

350 g of vinyltrimethoxysilane (VTMS) and 1000 g of water were agitated at 20° C. for one hour, and 0.4 g of 1N-ammonia aqueous solution was added and agitated for another 120 minutes to obtain a seed particle dispersion liquid.

<Particle Growth Step>

In a solution in which 166 g of vinyltrimethoxysilane and 475 g of water were agitated at 25° C. for one hour, 5 g of 1% dodecyl ammonium sulfate aqueous solution was mixed to prepare a particle growth solution. 180 g of the seed particle dispersion liquid was added to the particle growth solution and agitated for twenty minutes to obtain a dispersion liquid of the grown particles, which are grown seed particles.

<Composition Step>

The composition step was performed using a monomer emulsion and the grown particle dispersion liquid to obtain composite particles (first particles) of polymers and the grown particles. The monomer emulsion was prepared as described below. First, 5 g of azobisisobutyronitrile (AIBN), which serves as a polymerization initiator, was dissolved in 50 g of acrylonitrile to prepare a mixture liquid. 3 g of a sulfate ester salt (product name: Newcol 707SF, Nippon Nyukazai Co., Ltd, aqueous solution containing 30% by mass of solid content), which serves as an emulsifier, was dissolved in 100 g of an ion-exchanged water. The above mixture liquid and the solution were agitated with a homogenizer at 20000 rpm for one minute to prepare the monomer emulsion.

The monomer emulsion was added to the grown particle dispersion liquid and agitated for two hours. Then, the monomers were radically polymerized by holding the temperature at 70° C. for 6 hours to obtain a dispersion liquid of the composite particles (first particles). After being cooled, the dispersion liquid underwent solid-liquid separation by decantation and was washed three times with methanol. Subsequently, the washed first particles were naturally dried for two days and then heated and dried at 80° C. for one hour to obtain the first particles. The color of the obtained first particles was white.

<Carbonization Step>

The dried first particles were heated in a nitrogen atmosphere at 680° C. for one hour to obtain the second particles in which the organic component in the composite particles (first particles) was carbonized.

<Removal Step>

The obtained second particles were heated in an air atmosphere at 750° C. for four hours to obtain the black powder.

Example 3

<Preparation of Seed Particles>

In the preparation of the seed particles in example 3, a seed particle dispersion liquid was obtained in the same manner as in example 1 except in that the amount of added methyltrimethoxysilane was changed to 100 g.

<Particle Growth Step>

In a solution in which 240 g of methyltrimethoxysilane and 1187 g of water were agitated at 25° C. for one hour, 13 g of 1% dodecyl ammonium sulfate aqueous solution was mixed to prepare a particle growth solution. 200 g of the seed particle dispersion liquid was added to the particle growth solution and agitated for approximately two hours to obtain a grown particle dispersion liquid.

<Preparation of Coupling Agent Dispersion>

36 g of methacryloxypropyltrimethoxysilane and 142 g of water were agitated at 25° C. for one hour to prepare a coupling agent dispersion. The coupling agent dispersion was added to the grown particle dispersion liquid. The growth of the particles stopped after approximately two hours. Subsequently, 50 g of 25% by mass ammonia water was added to solidify the grown particles and obtain the first particles. The obtained first particles underwent solid-liquid separation by decantation and were washed three times with methanol. The washed first particles were naturally dried for two days and then heated and dried at 80° C. for one hour. The color of the obtained first particles was white.

<Carbonization Step>

The dried first particles were heated in a nitrogen atmosphere at 1100° C. for one hour to obtain the second particles in which the organic component in the first particles was carbonized.

<Removal Step>

The obtained second particles were heated in an air atmosphere at 1100° C. for one hour to obtain the black powder.

Example 4

<Preparation of Seed Particles>

240 g of methyltrimethoxysilane and 24 g of water were agitated at 30° C. for three hours, and 1200 g of water and 12 g of 1N-ammonia aqueous solution were added and agitated for another thirty minutes at 20° C. to obtain a seed particle dispersion liquid.

<Particle Growth Step>

In example 4, the particle growth step was repeated twice to obtain the first particles. In the first particle growth step, first, in a solution in which 240 g of methyltrimethoxysilane and 1187 g of water were agitated at 25° C. for one hour, 13 g of 1% dodecyl ammonium sulfate aqueous solution was mixed to prepare a particle growth solution. 400 g of the seed particle dispersion liquid was added to the particle growth solution and agitated while observing the particle diameter with an optical microscope. As a result, a first grown particle dispersion liquid was obtained.

In the second particle growth step, first, in a solution in which 240 g of methyltrimethoxysilane and 1187 g of water were agitated at 25° C. for one hour, 13 g of 1% dodecyl ammonium sulfate aqueous solution was mixed to prepare a particle growth solution. 400 g of the grown particle dispersion liquid, which was obtained in the first particle growth step, was added to the particle growth solution and agitated while observing the particle diameter with an optical microscope. As a result, a dispersion liquid of the further grown particles was obtained. After the growth of the particles stopped, 50 g of 25% by mass ammonia water was added to solidify the grown particles and obtain the first particles. The obtained first particles underwent solid-liquid separation by decantation and were washed three times with methanol. The washed solidified particles were naturally dried for two days and then heated and dried at 110° C. The color of the obtained first particles was white.

<Carbonization Step>

The second particles were obtained by heating the obtained first particles under the same condition as in example 1.

<Removal Step>

The black powder was obtained by heating the obtained second particles under the same condition as in example 2.

Example 5

In example 5, the black powder was obtained in the same manner as in example 4 except in that the particle growth step was repeated four times.

Comparative Example 1

In comparative example 1, the powder was obtained in the same manner as in example 1 except in that the removal step was omitted.

Comparative Example 2

In comparative example 2, the powder was obtained in the same manner as in example 2 except in that the removal step was omitted.

Comparative Example 3

In comparative example 3, the powder was obtained in the same manner as in example 1 except in that the removal step was performed at 300° C. for ten hours.

Comparative Example 4

In comparative example 4, the powder was obtained in the same manner as in example 1 except in that the carbonization step was omitted.

Comparative Example 5

In comparative example 5, 300 g of methanol and 100 g of 25% by mass ammonia water were added to 50 g of the second particles, which were obtained in the carbonization step in the same manner as comparative example 2, and agitated at 30° C. while dropping 24 g of tetraethoxysilane (TEOS) over ten minutes into the solution. The solution underwent solid-liquid separation by decantation after two hours and was then washed three times with methanol. Subsequently, the resultant was naturally dried for two days and then heated and dried at 300° C. to obtain the powder. The particles forming the powder each had a double-layered structure of a silica layer and an insulating layer (TEOS layer).

Comparative Example 6

In comparative example 6, a grown particle dispersion liquid was obtained by performing the same process as in example 2 until the particle growth step.

Subsequently, carbon black was absorbed by the grown particles and then solidified to obtain solidified particles. The carbon black was absorbed as described below. First, 100 g of the grown particle dispersion liquid was added to 5000 g of water and agitated at 25° C. while dropping 20 g of a dispersion liquid of carbon black isopropanol (solid content 30% by mass) over five minutes to have the grown particles absorb the carbon black. After approximately one hour, 600 g of 5% by mass polyvinyl alcohol solution was added to the solution and agitated for thirty minutes. Then, 30 g of 25% by mass ammonia water was added to solidify the particles and obtain the solidified particles. The obtained solidified particles underwent solid-liquid separation by decantation and were washed three times with methanol. The washed solidified particles were naturally dried over two days and then heated and dried at 110° C. The color of the obtained solidified particles was black.

The black-colored solidified particles were heated in an air atmosphere at 1000° C. for three hours to obtain the powder.

(Carbon Analysis of Particle Surface: X-Ray Photoelectron Spectroscopy)

The carbon content in the surfaces of particles of powder samples was measured. First, the powder was spread on an aluminum plate, fixed on a stage, and set in an X-ray photoelectron spectrometer. The X-ray photoelectron spectrometer measured a surface atomic concentration of the powder and calculated a surface carbon content (% by mass) in the particle surface. The X-ray photoelectron spectrometer that was used has a product name of PHI-5000 Versaprobell and was manufactured by ULVAC-PHI, Inc. The X-ray source of the X-ray photoelectron spectrometer was AlKα (1486.7 eV, 25 W, monochrome), the analysis region was φ100 μm, and a neutralizing electron gun was used. The surface atomic concentration was calculated based on peak strengths of detected elements (C, O, and Si) in a narrow spectrum using a relative sensitivity factor provided by ULVAC-PHI, Inc.

(Measurement of Carbon Content inside Silica Particles)

The carbon content inside the particles was measured for the powder samples. In the carbon content measurement, the quantity of carbon was determined by a high frequency induction furnace combustion-infrared absorption method using a carbon/sulfur analysis apparatus (manufactured by LECO Corporation, CS844 model). Operating conditions of the carbon/sulfur analysis apparatus were as follows.

Analysis time: 40 seconds
Cycle time: 90 seconds
Carrier gas: Oxygen (purity 99.6%)
Driving gas: Nitrogen
Carrier gas flow rate: 3 L/minute
A gas dosing of the carbon/sulfur analysis apparatus was not used, and a steel lens manufactured by LECO Corporation was used as a standard sample for quantity determination using with a single calibration curve.

(Measurement of Y Value)

The Y value in the XYZ color system of each powder sample was measured in accordance with JIS Z8701:1999. First, a quartz powder holder was set in a spectrophotometer (V-670, manufactured by JASCO Corporation) and a zero point adjustment was performed. Then, the powder was put into the powder holder to measure the Y value.

(Measurement of 10% K Value)

The 10% K value was measured for ten particles of each powder sample and the average 10% K value was obtained. A microcompression testing machine (MCTE-200, manufactured by Shimazu Corporation) was used for the measurement.

(Average Particle Size and CV Value)

The particles (powder) in the manufacturing process and the manufactured powder were sampled to obtain the average particle size and the CV value using a Coulter counter.

(Withstand Voltage Test)

As shown in FIG. 1, a test panel 10 was first produced in the withstand voltage test. The panel 10 had a sandwich-like structure in which an upper ITO-coated substrate 11 and a lower ITO-coated substrate 11 sandwiched an insulating layer 12. The insulating layer 12 was formed of a mixture of particles 12a and a thermosetting resin 12b. The contact area of the upper ITO-coated substrate 11 and the insulating layer 12 and the contact area of the lower ITO-coated substrate 11 and the insulating layer 12 were both 500 mm².

To produce the panel 10, a resin composition was first prepared by mixing 92 parts by mass of a thermosetting resin (manufactured by Mitsui Chemicals, Inc., product name: LC-STRUCT BOND XN-21-S) and 8 parts by mass of the powder sample.

Then, the resin composition was sandwiched by the two ITO-coated substrates 11 (30 mm×25 mm×1.1 mm, EHC. Co., Ltd) to produce a laminated body. A pressure of 0.5 MPa was applied to the laminated body in a thickness-wise direction of the laminated body, and the resin composition was heat-treated at 80° C. for one hour for softening. Then, the resin composition was heat-treated at 120° C. for one hour for hardening to obtain the panel 10.

In the panel 10, the voltage was increased from 0 V to 240 V at a rate of 5 V per second between the two ITO-coated substrates 11, and the voltage was measured when short-circuiting occurred between the ITO-coated substrates 11. For each particle sample, three panels 10 were produced and the voltage was measured three times for each sample. Table 1 shows the values obtained by the three voltage measurements and the average value (withstand voltage) of the three voltage measurements. In the voltage measurement, if the obtained value was 240 V or greater, it was determined to be overrange (O.L.).

A reference value for a pass/fail determination of the withstand voltage test was set as described below. As a gap between the two substrates increases, for example, the drive voltage of the liquid crystal tends to increase. Thus, the particles are also required to have a higher withstand voltage characteristic. The dimension of the gap between the two substrates, that is, the dielectric breakdown voltage of the particles having a certain particle size was calculated from the following equation based on a relationship of the thickness of the glass and the dielectric breakdown voltage.

Dielectric breakdown voltage of particle (V)=Particle diameter (μm)×20 (V/μm)

The reference value for the pass/fail determination was set to the dielectric breakdown voltage of the particles. The particles that satisfy the reference value were determined to have passed the test. Further, when the dielectric breakdown voltage of the particles obtained from the above equation exceeds 240 V, a reference value is set to 240 V. Here, the voltage of a household power supply overseas is 240 V.

The results are shown in Tables 1 and 2.

TABLE 1

| | | Example 1 | Example 2 | Example 3 | Example 4 | Example 5 |
|---|---|---|---|---|---|---|
| Seed Particle | Average Particle Size (μm) | 4.57 | 11.33 | 3.23 | 12.81 | 13.20 |
| | CV Value (%) | 2.5 | 2.8 | 3.0 | 3.3 | 3.5 |
| First Particle | Average Particle Size (μm) | 10.05 | 20.31 | 6.84 | 41.2 | 77.2 |
| | CV Value (%) | 1.4 | 1.6 | 1.9 | 1.8 | 1.4 |
| Heating Condition | Nitrogen Atmosphere | 1000° C. 4 h | 680° C. 1 h | 1100° C. 1 h | 1000° C. 4 h | 1000° C. 4 h |
| Heating Condition | Air Atmosphere | 1000° C. 4 h | 750° C. 4 h | 1100° C. 1 h | 1000° C. 4 h | 1000° C. 4 h |
| Physical Property of Black Powder | Particle Structure | Single Layer | Single Layer | Single Layer | Single Layer | Single Layer |
| | Carbon (mass %) Surface | 0.3 | 0.4 | 0.3 | 0.3 | 0.4 |
| | Whole Content | 11 | 20 | 14 | 12 | 10 |
| | Y Value (%) | 0.5 | 0.4 | 1 | 0.4 | 0.3 |
| | Average Particle Size (μm) | 7.94 | 14.93 | 5.4 | 32.96 | 60.99 |
| | CV Value (%) | 1.4 | 1.5 | 1.5 | 1.8 | 1.5 |
| | 10% K Value (N/mm$^2$) × 10$^{-3}$ | 68 | 53 | 72 | 62 | 58 |
| Withstand Voltage Test | Actual Measurement Value (V) | 150 200 220 | O. L. | 130 130 140 | O. L. | O. L. |
| | Average Value (Withstand Voltage) (V) | 190 | | 133 | | |
| | Reference Value for Pass/Fail Determination | 159 | 240 | 108 | 240 | 240 |

TABLE 2

| | | Cmp. Example 1 | Cmp. Example 2 | Cmp. Example 3 | Cmp. Example 4 | Cmp. Example 5 | Cmp. Example 6 |
|---|---|---|---|---|---|---|---|
| Seed Particle | Average Particle Size (μm) | 4.57 | 11.33 | 4.57 | 4.57 | 11.33 | 8.58 |
| | CV Value (%) | 2.5 | 2.8 | 2.5 | 2.5 | 2.8 | 2.4 |
| First Particle | Average Particle Size (μm) | 10.05 | 20.31 | 10.05 | 10.05 | 16.02 | 15.47 |
| | CV Value (%) | 1.4 | 1.6 | 1.4 | 1.4 | 1.6 | 2.1 |
| Heating Condition | Nitrogen Atmosphere | 1200° C. 10 h | 680° C. 5 h | 1000° C. 4 h | N/A | N/A | N/A |
| Heating Condition | Air Atmosphere | N/A | N/A | 300° C. 10 h | 1000° C. 3 h | N/A | 1000° C. 3 h |
| Physical Property of Black Powder | Particle Structure | Single Layer | Single Layer | Single Layer | Single Layer | Double Layer | Single Layer |
| | Carbon (mass %) Surface | 1.6 | 1.9 | 1.2 | 0.2 | 0.4 | 1.3 |
| | Whole Content | 12 | 13 | 10 | 0 | 19 | 3 |

TABLE 2-continued

|  |  | Cmp. Example 1 | Cmp. Example 2 | Cmp. Example 3 | Cmp. Example 4 | Cmp. Example 5 | Cmp. Example 6 |
| --- | --- | --- | --- | --- | --- | --- | --- |
|  | Y Value (%) | 0.4 | 0.4 | 0.6 | 32 | 0.6 | 3.8 |
|  | Average Particle Size (μm) | 8.08 | 16.02 | 8.05 | 7.74 | 16.55 | 11.54 |
|  | CV Value (%) | 1.4 | 1.6 | 1.5 | 1.4 | 1.6 | 2.3 |
|  | 10% K Value (N/mm$^2$) × 10$^{-3}$ | 67 | 13 | 67 | 70 | 15 | 69 |
| Withstand Voltage Test | Actual Measurement Value (V) | 140 140 150 | 60 80 100 | 80 120 120 | O. L. | 70 90 100 | 70 70 100 |
|  | Average Value (Withstand Voltage) (V) | 143 | 80 | 107 |  | 87 | 80 |
|  | Reference Value for Pass/Fail Determination | 162 | 240 | 161 | 155 | 240 | 231 |

The black powder obtained in each example evidently had a relatively high blackness and passed the withstand voltage test.

The powder of comparative examples 1 to 3, 5, and 6 failed the withstand voltage test. The black powder was not obtained in comparative example 4.

A volume resistance value (apparent electric resistivity) of the particles was measured for the powder of comparative example 2 in accordance with JIS B9915 with 10% by volume of moisture at the measurement temperature of 80° C. A relatively high value of $7.5 \times 10^{10}$ Ω·cm was obtained as the result. Therefore, if the withstand voltage test was designed for a use in a high voltage environment, the test will be failed even when a relatively high volume resistance value is obtained.

The particles forming the powder of comparative example 5 had a double-layered structure including the silica layer and the insulating layer. It is assumed that comparative example 5 failed the withstand voltage test due to a low dielectric breakdown voltage of the insulating layer and cracks in the insulating layer caused from pressing.

In the particles forming the powder of comparative example 6, the carbon black scattered in the particle surface was difficult to be removed. Thus, carbon greater than or equal to a certain amount remained in the particle surface. This resulted in failure of the withstand voltage test.

In a state in which the silica particles forming the black powder of each example were relatively densely spread, the structural color was recognized when seen in a predetermined angle in a light emitted under a predetermined condition. The structural color appeared regardless of whether the arrangement of the laid out silica particles was in order or in disorder. For example, structural color such as red and green were recognized in the surface layer of the black powder in a state spread and settled by gravitational force or centrifugal force, or in the surface layer of the black powder in a state spread by, for example, a vibration compaction. When the black powder of example 1 is observed with an optical microscope, the color of each silica particle was black. However, when the black powder of example 1 was set in a transparent container and a vibration compaction was performed to form a particulate aggregate having a certain density, the structural color of its surface layer portion was red-purple as a whole.

Further, the orientation state of the black powder, which was obtained in example 1 and used as a spacer of a liquid crystal panel, was evaluated as below.

First, a liquid crystal panel for testing was produced in the same manner as the panel 10 for the withstand voltage test shown in FIG. 1 except in that the insulating layer 12 of the panel 10 was changed from the thermosetting resin 12b to a liquid crystal material. Hereafter, the reference numerals of FIG. 1 are incorporated to describe components corresponding to those shown in FIG. 1.

The liquid crystal panel had a structure in which the upper ITO-coated substrate 11 and the lower ITO-coated substrate 11 sandwiched a liquid crystal layer formed of a mixture of the particles 12a and a liquid crystal material. The contact area of the upper ITO-coated substrate 11 and the liquid crystal layer 12 and the contact area of the lower ITO-coated substrate 11 and the insulating layer 12 were both 500 mm$^2$.

To produce the liquid crystal panel, a liquid crystal composition was first prepared by mixing 92 parts by mass of a liquid crystal material (manufactured by Merck, ZLI-2293) and 8 parts by mass of the black powder obtained in example 1.

Then, the liquid crystal composition was sandwiched by the two ITO-coated substrates 11 (30 mm×25 mm×1.1 mm, EHC. Co. Ltd.) to produce a laminated body. Further, the periphery of the laminated body was sealed except for one side and a pressure of 0.5 MPa was applied to the laminated body in the thickness-wise direction of the laminated body to remove excess liquid crystal composition. Then, the remaining one side of the periphery was sealed to obtain the liquid crystal panel for testing.

A voltage of 100 V was applied to the produced liquid crystal panel while performing switching at intervals of five seconds. After 72 hours, the particles were observed with an optical microscope for light leakages.

A liquid crystal display element using the liquid crystal cell had almost no light leakage resulting from an abnormal orientation of the liquid crystal molecules at interfaces of the liquid crystal molecules and the spacer particles when activated and lit. This indicates that the spacer interface had a small effect on the liquid crystal molecules.

In the powder obtained in comparative example 2, a liquid crystal panel for testing was produced in the same manner as described above and the orientation state of the liquid crystal molecules was evaluated. The result showed light leakages.

The invention claimed is:

1. A method for manufacturing a black powder comprising silica particles that contain carbon, wherein
each of the silica particles is single-layered, and
the content of carbon contained in the surfaces of the silica particles measured by an Xray photoelectron spectroscopy is 1% by mass or less, the method comprising:
obtaining first particles containing a condensate that is obtained from trialkoxysilane, which is expressed by equation (1):

$$R_1Si(OR_2)_3 \quad (1)$$

(in equation (1), $R_1$ is a non-hydrolyzable group and represents an alkyl group having 1 to 20 carbon atoms, an alkyl group having 1 to 20 carbon atoms and including a (meth)acryloyloxy group or an epoxy group, an alkenyl group having 2 to 20 carbon atoms, an aryl group having 6 to 20 carbon atoms, or an aralkyl group having 7 to 20 carbon atoms, $R_2$ represents an alkyl group having 1 to 6 carbon atoms, and $OR_2$ may be the same or differ from each other);
carbonizing an organic component in the first particles by heating the first particles in a gas having a lower oxygen concentration than air to obtain second particles containing carbon; and
removing carbon contained in the surfaces of the second particles by heating the second particles under an atmosphere that contains oxygen.

2. The method according to claim 1, wherein the removing of the carbon includes volatilizing carbon contained in the surfaces of the second particles as carbon oxide gas.

3. The method according to claim 1, wherein the heating of the second particles is performed at a temperature of 400° C. or greater.

* * * * *